(12) United States Patent
Bennett et al.

(10) Patent No.: US 9,946,720 B1
(45) Date of Patent: Apr. 17, 2018

(54) SEARCHING DATA FILES USING A KEY MAP

(71) Applicant: IONU SECURITY, INC., Longmont, CO (US)

(72) Inventors: David W. Bennett, Longmont, CO (US); Timothy E. Beres, Boulder, CO (US); Alan M. Frost, Reno, NV (US)

(73) Assignee: IONU SECURITY, INC., Longmont, CO (US)

( * ) Notice: Subject to any disclaimer, the term of this patent is extended or adjusted under 35 U.S.C. 154(b) by 180 days.

(21) Appl. No.: 14/958,981

(22) Filed: Dec. 4, 2015

(51) Int. Cl.
*H04L 29/06* (2006.01)
*G06F 17/30* (2006.01)

(52) U.S. Cl.
CPC .. *G06F 17/30109* (2013.01); *G06F 17/30864* (2013.01); *H04L 63/045* (2013.01); *H04L 63/061* (2013.01)

(58) Field of Classification Search
CPC ......... G06F 17/30109; G06F 17/30864; H04L 63/045; H04L 63/061
See application file for complete search history.

(56) References Cited

U.S. PATENT DOCUMENTS

| 9,202,074 | B1 | 12/2015 | Bennett et al. | |
| 2004/0030930 | A1 | 2/2004 | Nomura | |
| 2007/0230706 | A1 | 10/2007 | Youn | |
| 2008/0089517 | A1 | 4/2008 | Bianco et al. | |
| 2013/0226907 | A1* | 8/2013 | Wolf | G06F 17/30554 707/722 |

OTHER PUBLICATIONS

Cao et al; Privacy-Preserving Multi-Keyword Ranked Search over Encrypted cloud data; 2014; IEEE Computer Society.*
U.S. Appl. No. 14/958,985, filed Dec. 4, 2015.

* cited by examiner

*Primary Examiner* — Kendall L Dolly
(74) *Attorney, Agent, or Firm* — Crawford Maunu PLLC

(57) ABSTRACT

Approaches for searching for key terms in a plurality of files include associating a respective key map with each file of the plurality of files in memory of a server. Each key map includes a plurality of bit values and each bit value indicates for a key term whether or not the key term is present in the associated file. The server inputs a search map, and the search map includes a plurality of bit values. Each bit value in the search map indicates for a key term whether or not the key term is a key term to search. The server determines for each key map, whether or not the key map satisfies the search map. Data indicating each file of the plurality of files having an associated key map that satisfies the search map is output by the server.

26 Claims, 13 Drawing Sheets

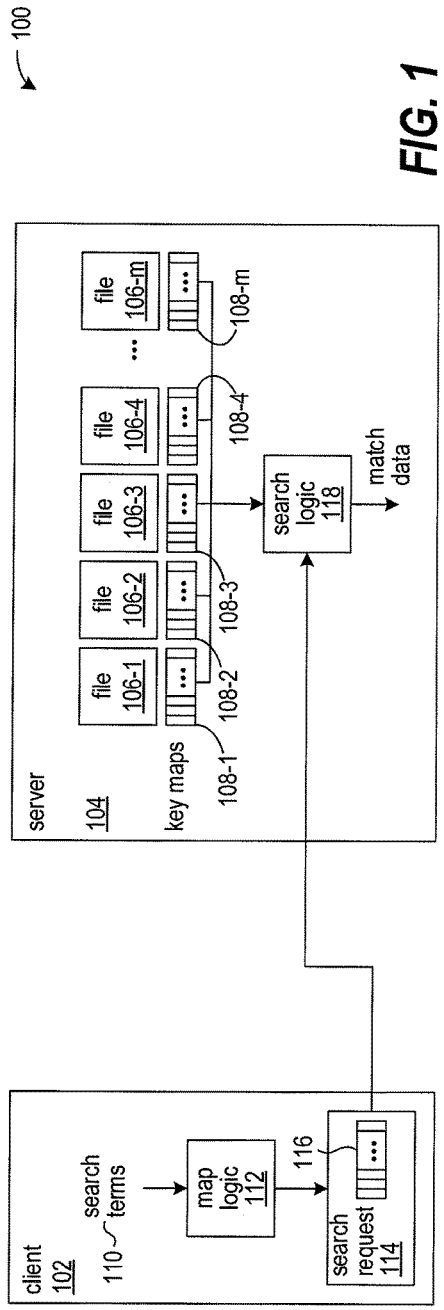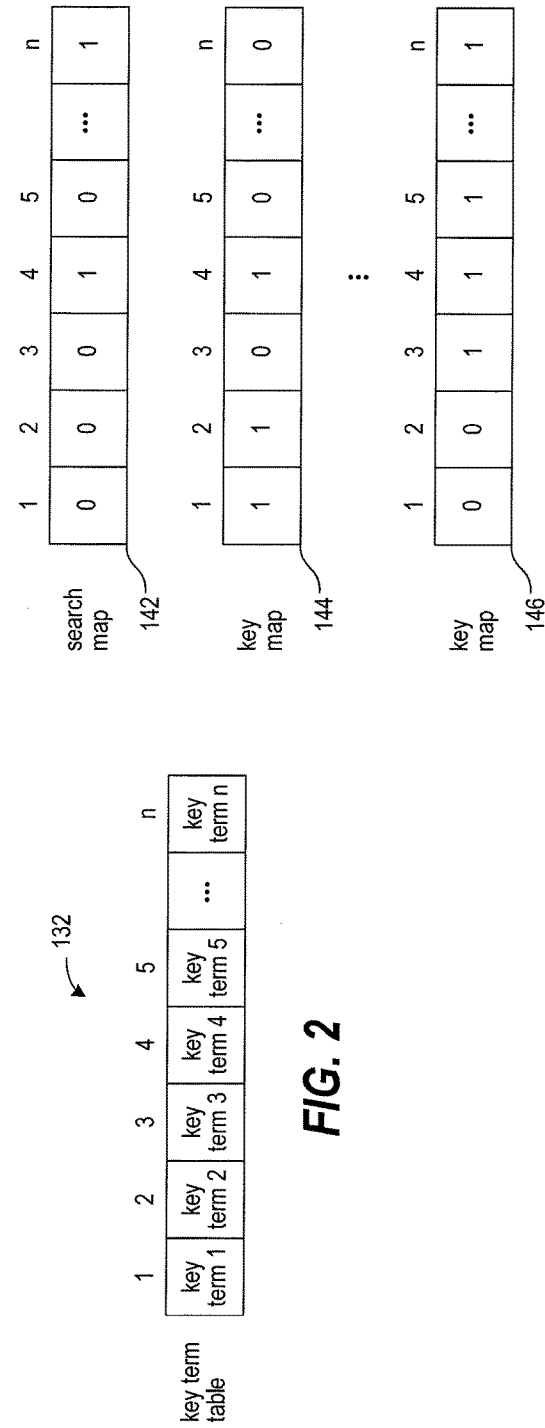

| bit position | 1 | 2 | 3 | 4 | 5 | 6 | 7 | 8 | 9 | 10 | 11 | 12 | 13 | 14 | 15 | 16 | | n |
|---|---|---|---|---|---|---|---|---|---|---|---|---|---|---|---|---|---|---|
| 252 ⟋ stream of bits | 1 | 0 | 0 | 1 | 0 | 1 | 0 | 1 | 0 | 0 | 0 | 1 | 1 | 0 | 1 | 1 | ... | 0 | key term table 254

| key terms | bit positions |
|---|---|
| key term 1 | 2 |
| key term 2 | 3 |
| key term 3 | 7 |
| key term 4 | 9 |
| ⋮ | |
| key term m | n |

⟋ 256 stream of bits with selected 1s changed to 0s: 1 0 0 0 0 0 0 0 0 0 0 1 0 0 0 0 ... 0

⟋ 258 example key map: 1 1 1 0 0 0 0 0 1 0 0 0 0 0 0 0 ... 0

⟋ 260 example search map: 1 0 0 0 0 0 0 1 0 0 0 0 0 0 0 ... 1

FIG. 6

|  | 1 | 2 | 3 | 4 | 5 | ... | n |
|---|---|---|---|---|---|---|---|
| key map 1 | 1 | 1 | 0 | 1 | 0 | ... | 0 |
| key map 2 | 0 | 1 | 1 | 0 | 1 | ... | 0 |
| key map 3 | 0 | 0 | 1 | 1 | 0 | ... | 0 |
| ⋮ | | | | | | | |
| key map m | 0 | 0 | 1 | 1 | 1 | ... | 1 |

382

| index | | | |
|---|---|---|---|
| 1 | file 1 | | |
| 2 | file 1 | file 2 | |
| 3 | file 2 | file 3 | file m |
| 4 | file 1 | file 3 | file m |
| 5 | file 2 | file m | |
| ⋮ | | | |
| n | file m | | |

384

|  | 1 | 2 | 3 | 4 | 5 | ... | n |
|---|---|---|---|---|---|---|---|
| search map | 0 | 0 | 0 | 1 | 0 | ... | 1 |

*FIG. 10*

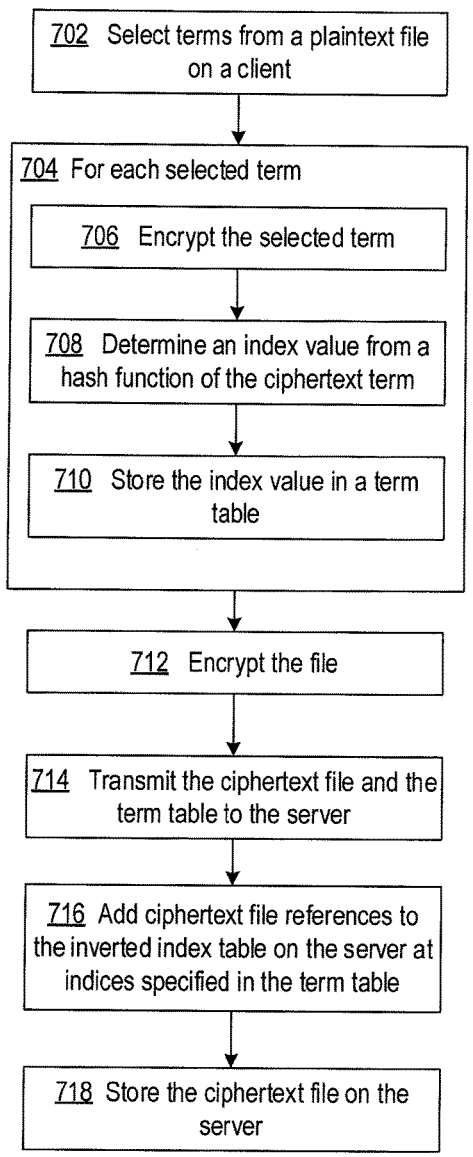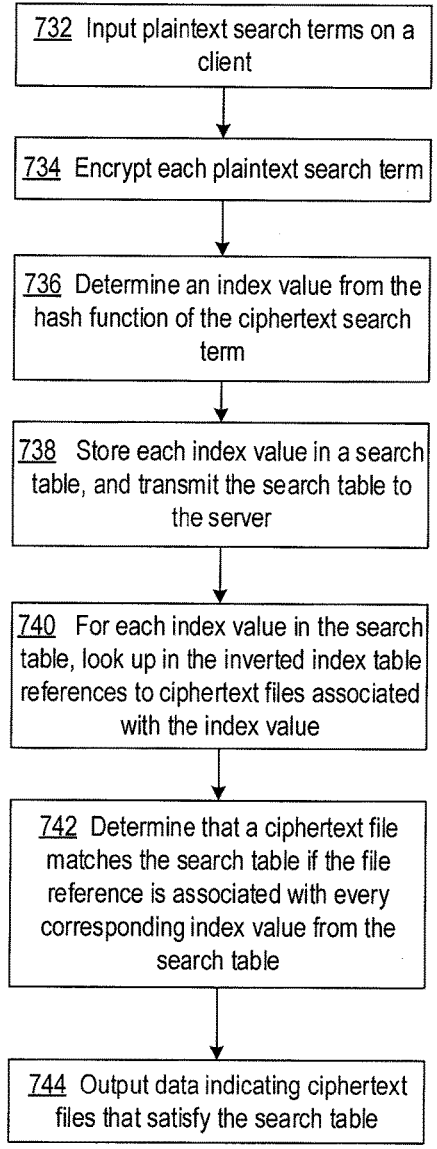
FIG. 16
FIG. 17 term table 1: | 5 | 2 | term table 2: | 3 | 9 | 6 | 4 | term table 3: | 7 | n | 5 | 6 |

⋮ term table m: | 7 | n | 1 | 8 | 9 | ... | 2 |

746

| index | | |
|---|---|---|
| 1 | file m | |
| 2 | file 1 | file m |
| 3 | file 2 | |
| 4 | file 2 | |
| 5 | file 1 | file 3 |
| 6 | file 2 | file 3 |
| 7 | file 3 | file m |
| 8 | file m | |
| 9 | file 2 | file m |
| ⋮ | | |
| n | file 3 | file m |

748 search table: | n | 5 | 7 |

*FIG. 18*

SEARCHING DATA FILES USING A KEY MAP

FIELD OF THE INVENTION

One or more embodiments generally relate to searching for files that satisfy a search expression.

BACKGROUND

Collaborative development of various documents had traditionally been done within the confines of a secure network, such as that of a corporation or other business entity. For example, reports, product requirements, and other documents were created and revised by users accessing the secure network. With the advent of high-speed communications and mobile devices such as notebook computers, tablet computers, and smart phones, collaborative development has been extended beyond secure networks.

Extra security measures are often employed with documents being accessed beyond the secure network. For example, data authentication and encryption may be used to ensure that data is received from a trusted source and has not been tampered with, and that the data cannot be intercepted and accessed by an unauthorized party.

Though documents have been encrypted and made available in shared storage, such as on storage provided by servers connected to the Internet, users may desire to search for documents having words and/or phrases that match specified search queries. However, maintaining secrecy over information contained in the documents may impede providing search functions. Storing plaintext words, key words, and phrases on the server(s) to aid in searching would be undesirable as information about the files may be leaked.

Managing the authentication and encryption keys is challenging when a particular document may be accessed by many different users, and each user may access that document with a number of different devices. Not only must the security of the document be maintained, but the security mechanism must not be so cumbersome that undue burdens are imposed on those accessing the document.

SUMMARY

In one embodiment, a method of searching for key terms in a plurality of files includes associating a respective key map with each file of the plurality of files in memory of a server. Each respective key map includes a plurality of bit values and each bit value indicates for a respective key term of a plurality of possible key terms whether or not the respective key term is present in the associated file. The server inputs a search map, and the search map includes a plurality of bit values. Each bit value in the search map indicates for a respective key term of the plurality of possible key terms whether or not the respective key term is a key term to search. The server determines for each respective key map, whether or not the respective key map satisfies the search map. Data indicating each file of the plurality of files having an associated respective key map that satisfies the search map is output by the server.

A system for searching for key terms in a plurality of files is provided in another embodiment. The system includes a server that has a processor and a memory. The memory is configured with instructions that when executed by the processor, cause the processor to associate a respective key map with each file of the plurality of files in the memory. Each respective key map includes a plurality of bit values, and each bit value indicates for a respective key term of a plurality of possible key terms whether or not the respective key term is present in the associated file. In executing the instructions, the server inputs a search map. The search map includes a plurality of bit values, and each bit value indicates for a respective key term of the plurality of possible key terms whether or not the respective key term is a key term to search. For each respective key map, the server determines whether or not the respective key map satisfies the search map and outputs data indicating each file of the plurality of files having an associated respective key map that satisfies the search map.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which:

FIG. 1 shows a computing arrangement for searching files using key maps and a search map according to one implementation;

FIG. 2 shows a key term table that maps key terms to positions in key maps and search maps;

FIG. 3 shows examples of a search map and two key maps;

FIG. 6 shows an example in which key maps and search maps may be obfuscated using the process of FIG. 5;

FIG. 10 shows an example in which m key maps are converted into an inverted index table, along with an example search map;

FIG. 16 shows a flowchart of a process of preparing an inverted index table from ciphertext file terms by a client and a server;

FIG. 17 shows a flowchart of a process of searching for files that match ciphertext search terms using inverted index tables;

FIG. 18 shows an example in which an inverted index table has been constructed from m term tables, and a search table that may be processed against the inverted index table;

DETAILED DESCRIPTION OF THE DRAWINGS

Figure 4:
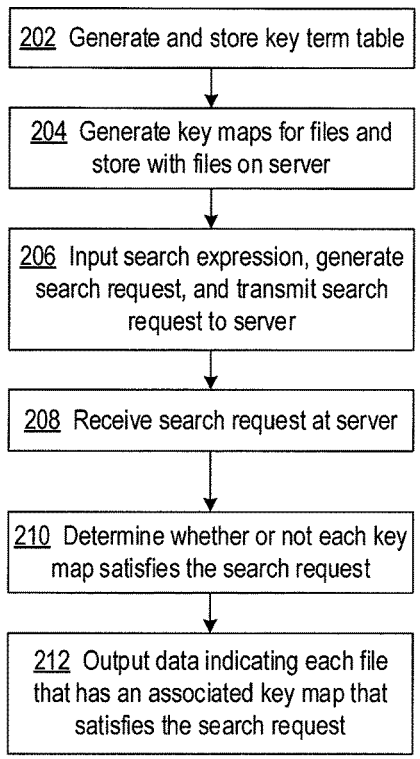
FIG. 4 shows a flow chart of a process for searching files using a key map and a search map.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

It will be recognized that modern search engines use highly complex algorithms and large quantities of precomputed data to capture a user's intent from their search request and return the most relevant information quickly from extremely large document sets. The disclosed methods and systems provide mechanisms for searching both plaintext and ciphertext files without requiring complex algorithms and large quantities of precomputed data. The files may include any type of data, such as program instructions, text, numbers, or metadata associated with images, video data, and/or audio data. In addition to and in combination with approaches for searching, the disclosed methods and systems provide protection for information in a file.

In one method of searching files, key maps and files are stored on a server, and the key maps are associated with the files in memory on the server. Each key map includes a plurality of bit values, and each bit value indicates for a respective key term of different possible key terms, whether or not the respective key term is present in the associated file.

A key term may be a word, an acronym, a numeric code or any other term that may be searched. In one implementation, a set of possible key terms is initially defined. Some key terms may be roots that identify multiple words in a language. For example, a language may include multiple verb tenses, possessive nouns, articles and pronouns, and variations in spelling, all of which can be folded into a set of root key terms. In addition, case folding, punctuation stripping, abbreviation expansion, spelling correction and other techniques may be used to help ensure that all forms of a key term map to a single form.

A search is initiated on the server in response to inputting one or more search maps. The search map may be created on a client and transmitted to the server for processing. Each search map includes a plurality of bit values, and each bit value indicates for a respective key term of possible key terms whether or not the key term is a key term to search. For each key map, the server determines whether or not the key map satisfies the search map. For example, for a single search map, an AND operator may be implied for the indicated key terms. If all the key terms indicated in the search map are also indicated in a key map, the key map satisfies the search map.

Multiple search maps may be created on a client if multiple operators, such as AND, OR and NOT, are specified in the search. In one implementation, the operators are not encrypted for the server, and a secure connection is used for client-server communications. Alternatively, the operators could be encrypted with a key shared by the client and the server. The server outputs data indicating each file having an associated key map that satisfies the search map. The output data may be a reference to the matching file, such as a uniform resource locator (URL).

In other implementations, the files to be searched may be part of a collection and share a secret that is not known by the server and can be used as a key. The files may be encrypted, and the key may be used by clients in extracting useful information from the files. By encoding the key terms present in the files in a key map and encoding the key terms to search in a search map, the file information and search information is hidden from the server.

FIG. 1 shows a computing arrangement for searching files using key maps and a search map according to one implementation. The computing arrangement includes a client 102 and a server 104, which may be communicatively coupled by a private or public network (not shown). The client may be a desk top computer, notebook computer, tablet computer, or smart phone, for example. The server may be one or multiple computer systems that cooperatively provide file storage and search functions for users operating clients.

The server 104 is configured with files 106-1-106-$m$ and associated key maps 108-1-108-$m$ that are searchable based on search requests from the client. The files may contain any type of data for which searches may be desired. For example, the files may include program instructions, text, numbers, or metadata and/or tags associated with images, video and/or audio data. In one implementation, each key map includes bit values that correspond to respective key terms in the associated file.

Search speed may be improved as the search map may be ANDed with each key map to determine which key maps satisfy the search map. If the result of ANDing a key map and the search map is non-zero, at least one of the key terms indicated by the search map is present in the key map. If the result is equal to the search map, all the key terms indicated by the search map are present in the associated file. The AND operation between the search map and a key map may be performed faster than comparing key terms in a search request to key terms in a key term table associated with a file. The disclosed key maps having a single bit corresponding to each key term would also require less storage than a table that lists the key terms in a file. In implementations in which the files 106-1-106-$m$ are encrypted, a key map provides a mechanism to indicate key terms that are present in the associated file without exposing information contained in the file.

In initiating a search, search terms 110 are input to client 102, such as by typing or pointing-and-clicking. Operators may also be input for more complex search queries. Map logic 112 program code executing on the client generates a search request 114 from the search terms. The search request includes one or more search maps, such as search map 116. The search map includes bit values that indicate which of the possible key terms are to be searched. For searches having multiple operators, the map logic may generate multiple search maps, and the search request 114 includes operators associated with the search maps.

The client transmits the search request to the search logic 118 program code, which executes on the server 104. The search logic inputs the key maps 108-1-108-$m$ and determines whether or not each key map satisfies the search map, such as by performing an AND operation between the bits in the search map and key map. If the result of the AND operation is 0 none of the key terms indicated by the search map are present in the file associated with the key map. If the result is equal to the search map, then all of the terms in the search map are present in the file associated with the key map. The search logic 118 outputs match data that indicate each file having an associated key map that satisfies the search map (or multi-operator search expression of the search request). When multiple search terms are present in the search request partial matches may be used in ranking the matching documents. For example with a search request having 5 key terms, documents containing all 5 would rank higher than those containing only 4 matching terms. Partial matching is most useful when none or only a few documents contain all of the search terms.

FIG. 2 shows a key term table 132 that maps key terms to positions in key maps and search maps. Key term 1 is mapped to bit position 1 in the key map and search map, key term 2 is mapped to bit position 2 in the key map and search map, key term 3 is mapped to bit position 3 in the key map and search map etc.

The key term table may be stored as a data structure by the client and used to create key maps for files and to create search maps for search requests. In creating a key map for a file, the client determines whether or not each key term in the key term table 132 is present in the file. If the key term is present in the file, a bit value 1 is stored at the bit at the position in the key map that corresponds to the index of the key term in the key term table. If the key term is not present in the file, a bit value 0 is stored at the position in the key map that corresponds to the index of the key term in the key term table.

FIG. 3 shows examples of a search map and two key maps. The search map 142 and key maps 144 and 146 correspond to a key term table having n key terms. Using key term table 132 from FIG. 2 as an example of a set of key terms, key map 144 is associated with a file having key term 1, key term 2, and key term 4, as shown by bit positions 1, 2, and 4 having a bit value 1 in the key map. Key map 146 is associated with a file having key term 3, key term 4, key term 5, and key term n. Search map 142 specifies a search request that seeks key terms 4 and n, as shown by the bit value 1 in bit positions 4 and n in the search map.

ANDing search map 142 and key map 144 yields a non-zero result as both the search map and key map have a 1 bit value in position 4. However, the result is not equal to the search map as the search map does not have a 1 bit value in positions 1 and 2, and the key map does not have a 1 bit value in position n. Thus, key map 144 satisfies the search map for the OR operator (key term 4 OR key term n), but does not match the search map for the AND operator (key term 4 AND key term n). ANDing search map 144 and key map 146 yields the search map. Thus, key map 146 satisfies the search map for both AND and OR operators.

FIG. 4 shows a flow chart of a process for searching files using a key map and a search map. At block 202, a key term table is generated and stored in memory on the client. The key term table includes a selected set of key terms, and for each key term, an indication of the bit position in a key map and search map of the bit value corresponding to the key term. The key term table may be a data structure, such as a sorted table or tree, that supports fast lookup of a key term and the associated indicated bit position. The key term table may be expanded to accommodate additional key terms.

One or more clients generate the key maps for associated files and transmit the files and associated key maps to a server(s) for storage at block 204. A client may build a sorted tree data structure having all terms in a file, and then search the sorted tree data structure for each key term in the key term table. Each key term in the sorted tree data structure may have additional associated information that indicates the location of the key term in the file or the context in which the key term is used in the file. If the key term is found, a bit value 1 is stored at the bit position in the key map as indicated by the key term table. If the key term is not found, a bit value 0 is stored at the bit position. Additional information may be stored in the key map for each key term found in the file. For example, the additional information may indicate the location in the file at which the key term was found, such as in a title, in metadata, in a URL. The additional information may be used to rank quality of matches.

At block 206, a client inputs a search expression, generates a search request, and transmits the search request to the server. The input search expression may be a simple list of a set of key terms or may include one or more logic operators (e.g., AND, OR, NOT) along with the key terms. For a simple list of key terms, such as: "key-term-1 key-term-2 key term 3," an AND operator may be the default operator in one implementation, and specification of the OR operator may be required to effect an OR operation.

Search expressions may be preprocessed on the client to match the document processing (e.g., case folding) and additional techniques for abbreviations, synonyms and spelling correction may be applied to improve the matching. The operators may include standard search operators such as AND, OR, and NOT, along with more precise operators such as "intitle:Dave", "filetype:PDF," etc. Search requests and results may be communicated over a secure channel such as SSL/TLS. Additional encryption may be applied, such as by packaging the search request using the server's public key and the results using the client's public key, which ensures that identical query and result strings are always different over the wire.

The server receives the search request at block 208, and at block 210 determines whether or not each key map satisfies the search request. If the search request includes a single search map and the AND operator is the default, a key map is determined by the server to satisfy the search map if the result of ANDing the key map and search map is equal to the search map. The search request may specify an OR operator for a single search map, and a key map is determined by the server to satisfy the search map if the result of ANDing the key map and search map is not equal to all 0 bit values (at least one of the bits in the search map and the corresponding bit in the key map both have a bit value 1).

For a search request having multiple search maps and logic operators, each search map is ANDed with a key map, and the logic operators applied to the results.

For example, a search expression may be:

((A AND B) OR (C AND D)) AND NOT E where A, B, C, D, and E are key terms. The search maps may be:

| | | | | | |
|---|---|---|---|---|---|
| search map 1 for (A AND B) | 1 | 1 | 0 | 0 | 0 |
| search map 2 for (C AND D) | 0 | 0 | 1 | 1 | 0 |
| search map 3 for NOTE | 0 | 0 | 0 | 0 | 1 | where A, B, C, D, and E correspond to bit positions 1, 2, 3, 4, and 5 in the key maps, respectively. Each of the search maps may be ANDed with a key map, yielding three sets of results:

result 1=search map 1 AND key map
result 2=search map 2 AND key map
result 3=search map 3 AND key map The final result applies the logic operators to the three sets of results:

final result=(result 1 OR result 2) AND NOT result 3

It will be appreciated that the AND operators for (A AND B) and (C AND D) parts of the expression are covered by the search maps 1 and 2, respectively, as the AND operator between two key terms may be the default specification in the search map.

At block 212, the server outputs data indicating each file that has an associated key map that satisfies the search request. The data may include URLs of files or other references that enable a user to access the matching files and may be output via a network interface circuit to a client.

In implementations in which the files are stored in ciphertext form on the server(s), it may be desirable to obfuscate the key maps and search maps. If the dictionary of key terms is known, one can easily identify the keywords each file contains. Though this may not be considered a major leak, security may be enhanced by obfuscating the key maps and search maps.

Figure 5:
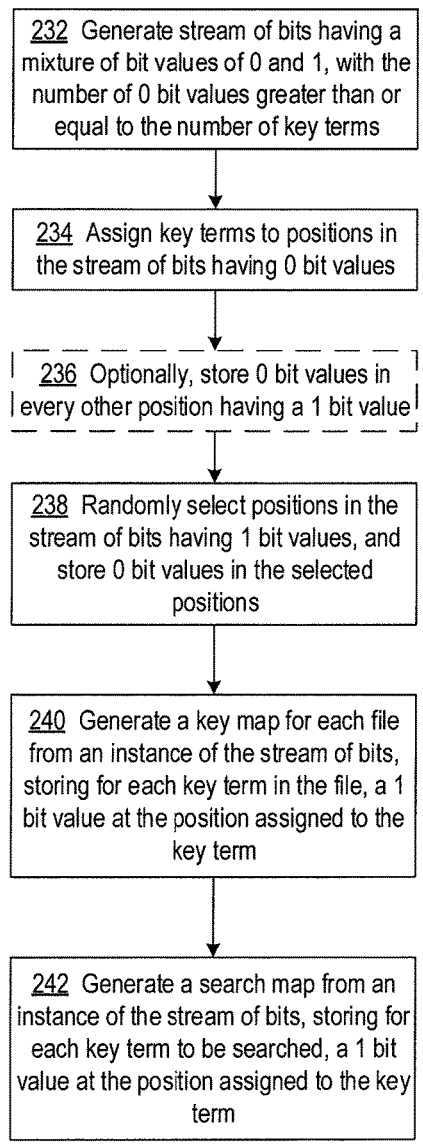
FIG. 5 is a flowchart of a process for obfuscating key maps and search maps.

FIG. 5 is a flowchart of a process for obfuscating key maps and search maps. FIG. 6 shows an example in which key maps and search maps may be obfuscated using the process of FIG. 5. At block 232, a stream of bits is generated, and the stream of bits has a mixture of 0 and 1 bit values, with the number of 0 bit values being greater than or equal to the number of possible key terms. In one implementation, the stream of bits may be generated by encrypting a series of counter values and concatenating the encrypted counter values until a sufficient number of 0 bits are in the stream of bits. Each key term is assigned to a respective position having a 0 bit value in the stream of bits at block 234.

The stream of bits 252 in FIG. 6 shows an example having n bits, with 0 bit values at bit positions 2, 3, 5, 7, 9, 10, 11, 14 and n. Key term table 254 shows key terms 1-4 and m having been assigned to bit positions 2, 3, 7, and n, respectively.

Additional security may be provided by optionally further obscuring the stream of bits. At block 236, 0 bit values are stored in every other position having a one bit value in the stream of bits. For example, FIG. 6 shows the initial stream of bits 252 having 1 values in positions 1, 4, 6, 8, 12, 13, 15, and 16. The obscured stream of bits 256 has bit positions 4, 8, 13, and 16 changed to 0 bit values.

When creating a key map for a file, at block 238 approximately half of the positions in the stream of bits having 1 bit values are randomly selected and the bit values are changed to 0. For example, in the stream of bits 256 in FIG. 6, bit positions 6 and 15 may have been randomly selected and changed to 0 bit values. The resulting stream of bits 256 is the starting point for a key map or search map.

At block 240, a key map is generated for each file from an instance of the stream of bits resulting from block 238. For each key term found in the file, a 1 bit value is stored in the key map at the position indicated by the key term table. Key map 258 in FIG. 6 shows an example in which key term 1, key term 2, and key term 4 are present in the associated file.

At block 242, a search map is generated from an instance of the stream of bits resulting from block 238. For each key term to search, a 1 bit value is stored in the search map at the position indicated by the key term table. Search map 260 in FIG. 6 shows an example in which key term 4 and key term m are to be searched for.

Figure 7:
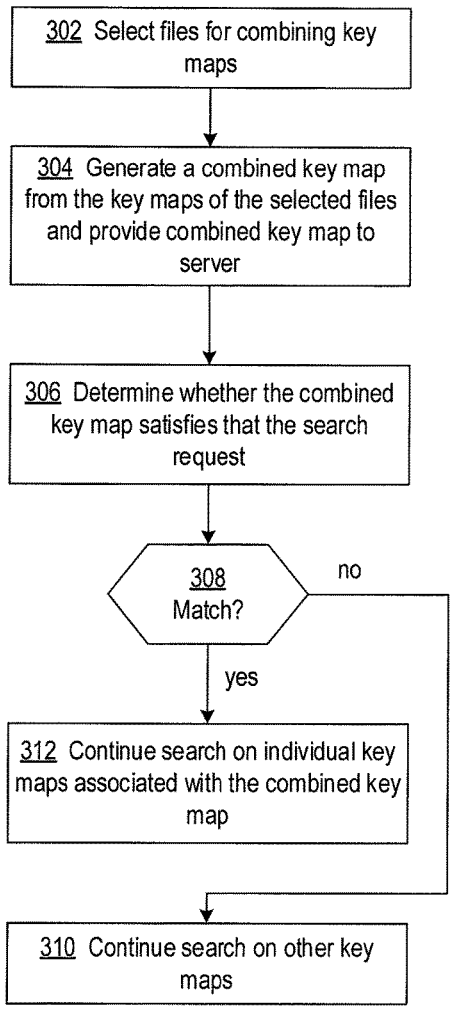
FIG. 7 shows a flowchart of a process of using sub-collections to further reduce the time spent searching for files that match a search map.

FIG. 7 shows a flowchart of a process of using sub-collections to further reduce the time spent searching for files that match a search map. If the number of files to search grows very large, groups of files may be organized into sub-collections to reduce the search time. For example, sub-collections may be based on file names or similarity of key word maps. In either case, the search can be optimized by ANDing the search map against the union (bitwise OR) of all the key maps of the sub-collection. All the key maps in a sub-collection may be quickly eliminated from consideration rather than evaluating each key map individually.

At block 302, files are selected by a client for combining into a sub-collection. A group of files may have related or similar file names, or the key maps may have some number of key terms in common. A combined key map is generated by the client from the individual key maps associated with the selected files at block 304 by performing a bitwise OR on the individual key maps. The combined key map is provided to the server for storage along with an indication of the files and/or key maps covered by the combined key map.

At block 306, in response to a search request, the server determines whether or not the combined key map satisfies the search maps(s) of the search request. If the combined key map does not satisfy the search request, decision block 308 directs the process to block 310 and the server may continue searching other combined key maps and key maps other than the key maps used to construct the combined key map. If the combined key map satisfies the search request, decision block 308 directs the process to block 312, and the server continues the search on the individual key maps that were used to construct the combined key map.

Figure 8:
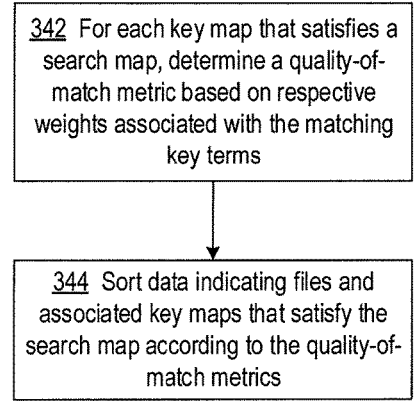
FIG. 8 shows a flowchart of a process that may be used to rank search results.

FIG. 8 shows a flowchart of a process that may be used to rank search results. Along with a bit value that indicates whether or not a key term is present in a file, the key map may also specify a weight, which indicates for each key term a level of importance of the key term relative to other key terms. The level of importance may be indicated by a numeric value. For example, a higher value may be specified for a key term that is found in a title of a document than for a key term that is in the body of the document.

At block 342, the server determines a quality-of-match value for each key map that satisfies a search request. The quality-of-match value may be determined based on a sum of the respective weights of the matching key terms between the key map and the search map(s) in a search request.

At block 344, the server sorts the data indicating the matching files according to the respective quality-of-match values.

Figure 9:
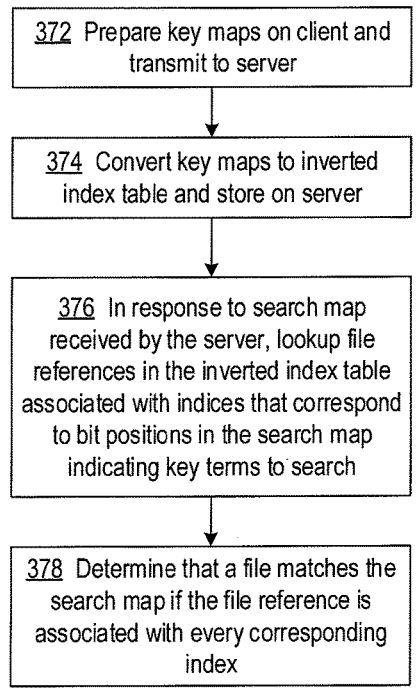
FIG. 9 is a flowchart of a process of using an inverted index table for file searches.

FIG. 9 is a flowchart of a process of using an inverted index table for file searches. The inverted index precomputes matches so that a table lookup may be performed to process a search. Each index in the inverted index refers to those files that have the key term associated with the corresponding position in a key map. For example, the key term "security" may be assigned to bit position 17. As each file and associated key map are uploaded to the server, if the bit value at bit position 17 in the key map is 1, a reference to the file is associated with index 17 in the inverted index. The reference may be a file name or URL, for example. When a search for "security" is executed, the server looks up the set of documents previously associated with index 17. Searches involving multiple key terms entail multiple lookups followed by a set operation. For example, a search for "security breach" implies "security" AND "breach," and files in the intersection between the set of files found to have "security" and the set of files found to have "breach" are the files found to match. With an inverted index, a search may be performed in O(1) time, as compared to a search using key maps may be performed in O(n) time, where (n is the number of documents to be searched).

In implementations in which the files are encrypted, file names may also be encrypted, which prevents the server from leaking the file name. The encrypted file names of files that satisfy a search request may be returned to a client and decrypted by the client.

FIG. 10 shows an example in which m key maps are converted into an inverted index table, along with an example search map. Elements of FIG. 10 may be referenced in conjunction with the description of the process of FIG. 9.

At block 372 of FIG. 9, the client prepares key maps for files and transmits the key maps and files to the server as previously described. The server converts the key maps to an inverted index table and stores the inverted index table at block 374. In other implementations, a portion of the inverted index table may be stored in client memory. Key maps 1-m in FIG. 10 are examples of key maps prepared by a client, and inverted index table 382 is an example of the inverted index table created from the key maps 1-m. Key map 1 indicates that the associated file includes the key terms associated with bit positions 1, 2, and 4. Thus, file 1 is identified at indices 1, 2, and 4 in the inverted index table 382. Similarly, key map 2 indicates that the associated file includes the key terms associated with bit positions 2, 3, and 5, and file 2 is identified at indices 2, 3, and 5 in the inverted index table.

At block 376 and in response to a search map, the server looks-up in the inverted index table the references to files that are associated with the indices corresponding to the bit positions in the search map having a bit value of 1. For example, the search map 384 in FIG. 10 has a 1 bit value in positions 4 and n. The inverted index table 382 has file 1, file 3, and file m associated with index 4, and file m associated with index n. At block 378, the server determines that a file matches the search map if the file reference is associated with every index corresponding to the search map bit positions having a bit value 1. In an implementation in which a portion of the inverted index table is stored in client memory, the processing of block 376 may be performed by the client. In FIG. 10, file m is the only file that is in both the sets of files, and therefore, the only matching file.

Constructing a stable and complete list of key terms may not always be possible. In many instances, technical terms and foreign language terms may be desired but difficult to include in a set of key terms a priori. In another approach for searching for files having specified terms, a set of terms that are neither key terms nor meaningless terms (for search purposes), such as articles, pronouns, conjunctions etc., may be assembled and considered in combination with the key term approach described above. Alternatively, the set of terms may be comprehensive and also include key terms.

According to the disclosed approaches, searchable encrypted files, which may be shared by users who share a decryption key, may be prepared by selecting plaintext file terms from each plaintext file to be shared. In one implementation, the plaintext file terms may be terms other than key terms or meaningless terms, and in another implementation, the selected plaintext file terms may include all meaningful terms from the file. Each selected plaintext file term is individually encrypted into a ciphertext file term using a first key. Each term may have augmentation data associated with it that can be later used during the search process for ranking the results in order of relevance and for more refined search operations. For example, terms that are metatags, terms in a title, terms in headings, etc. may be assigned greater relevance weights. The plaintext file is encrypted into a ciphertext file, also using the first key. The first key is encrypted into an encrypted first key with a second key, and the second key is encrypted into an encrypted second key with a public key of a public-private key pair. The client transmits the ciphertext file terms, ciphertext file, encrypted first key and encrypted second key to a server for storage.

To search for files having desired search terms, plaintext search terms are input to a client, and the client encrypts the plaintext search terms using the second key. The client transmits the ciphertext search terms to the server, and the server determines whether or not any of the ciphertext files has an associated set of ciphertext file terms that satisfies the ciphertext search terms.

Figure 11:
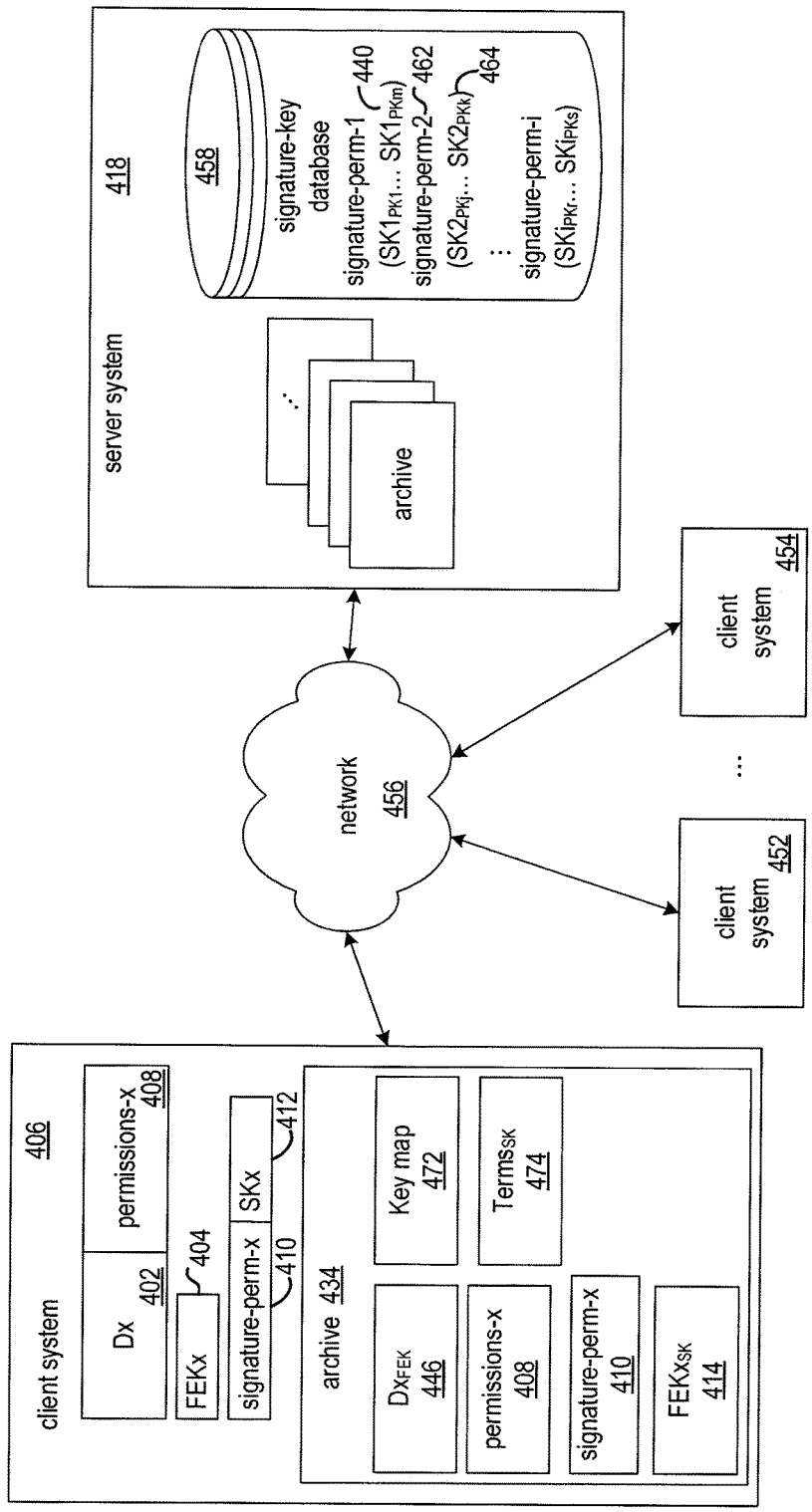
FIG. 11 shows an environment in which the key maps and/or sets of ciphertext file terms may be used in a system in which files are encrypted.

FIG. 11 shows an environment in which the key maps and/or sets of ciphertext file terms may be used in a system in which files are encrypted. The computing arrangement includes multiple clients 406, 452, and 454 that are communicatively coupled to a server 418 by a network 456, such as the Internet. The clients share access to file Dx 402. The server may be one or multiple computer systems that cooperatively provide file storage and search functions for users operating clients.

Client 406 is shown as being the system on which file Dx 402 is created. Permissions 408 (permissions-x) are stored in association with the file Dx. The permissions indicate which users have read access or read and write access to the file. A signature 410 is generated from the permissions 408. In an example implementation, the permissions are represented using Java-script object notation (JSON), and the signature is an MD5 hash of the left-most 12 bytes.

Plaintext file Dx 402 is encrypted using a file encryption key (FEKx) 404, and the FEKx is encrypted using a shared encryption key (SKx) 412. The encrypted FEKx ($FEKx_{SK}$) is stored in association with encrypted file Dx ($Dx_{FEK}$). In an example implementation, the $FEKx_{SK}$ 414 and $Dx_{FEK}$ 446, along with permissions-x 408 and signature-perm-x 410, are stored in archive 434, such as a POSIX tar format archive.

In an example implementation, the file encryption key FEK is a random 256-bit AES key (also referenced as random number) and is unique for every archive. The shared key SK may also be a random 256-bit AES key. The FEK may be generated by obtaining 32 bytes of random data from the OpenSSL Rand interface, for example. The FEK is only retentively stored in encrypted form. The FEK is not stored in retentive storage (e.g., disk) in plaintext form and is shredded from RAM of the client when it is no longer needed.

The shared key SKx 412 is encrypted on the client using a public key of a public-private key pair of the owner or creator of the file Dx 402. The shared key SKx may also be encrypted with the public keys of the other users who will be sharing access to the file, thereby creating multiple instances of the encrypted shared key. The encrypted shared key(s) is transmitted along with the signature 410 to the server 418 for storage. For a file that is shared by multiple users, multiple encrypted versions of the shared key may be generated by encrypting the shared key with the public keys of the different users. The signature and the encrypted shared key are provided to a server for storage. If multiple encrypted versions of the shared key are generated, those encrypted keys are also transmitted to the server for storage. The encrypted shared keys are stored by the server in association with the signature. A signature and associated keys may be referred to as a key ring in this description.

In one implementation, the server maintains a database 458 of signatures and associated sets of encrypted shared keys. Each signature covers an archive, and the associated set of encrypted shared keys are for those users who are permitted access to the file in the archive. In the example database 458, signature-perm-x 410 from the client is stored as one of the signatures signature-perm-1-signature-perm-i. For purposes of referencing the encrypted shared keys in FIG. 11, the label for each encrypted shared key identifies the file with which it is associated and the user whose public key was used to encrypt the shared key. For example, the label of shared key 440 is $SK1_{PKm}$, which indicates that the shared key is for file 1 and is encrypted with the public key of user m.

The same signature will be generated for all files that have the same permissions. If the permissions are the same, the same set of people are allowed to access the file, so the same shared key may be used. In this way, the local key ring can be kept fairly small. For files with same permissions, a server need not be repeatedly queried for the shared key.

Once the archive 434 has been created and the signature and associated encrypted versions of the shared key have been established at the server, the file may be shared between users at the clients 406, 452, and 454. As indicated above, the archive may be shared by way of a file server, email, or various other forms of file transfer.

When the archive has been established at a client for reading, the client needs to have the shared key in order to decrypt the encrypted $FEKx_{SK}$ 414 from the archive. The client checks whether or not the signature of the permissions 410 in the archive matches a locally stored signature, which has associated encrypted shared keys. If the signature is not locally stored, the client obtains the signature and associated encrypted shared keys from the server 418. The user who is requesting to read the file provides his private key, and the private key is used to decrypt the encrypted shared key. For example, if the file is file 2, the signature-perm-2 462 has associated encrypted shared keys 464, and the client decrypts the one of shared keys 464 that belongs to the user with the user's private key. Note that the encrypted shared keys may be tagged with information that identifies the user whose public key was used to encrypt the shared key so that the proper encrypted shared key may be decrypted.

Using the decrypted shared key, the client decrypts the encrypted file encryption key $FEKx_{SK}$ 414 from the archive. The decrypted FEK is then used by the client to decrypt the encrypted file $Dx_{FEK}$ 446 from the archive.

FIG. 11 also shows that each file may have an associated key map 472 and/or an associated set of ciphertext file $Terms_{SK}$ 474. The key map and set of ciphertext file terms may be employed separately or in combination. In implementations in which key maps are employed, for each encrypted file $Dx_{FEK}$ 446 created by a client, the client generates and stores an associated key map 472 in the archive 434. In implementations in which sets of ciphertext file terms are employed, for each encrypted file created by a client, the client generates and stores the set of ciphertext file $Terms_{SK}$ 474 in the archive 434. The archives are stored on server 418.

In another implementation, the key maps may be encrypted. The client 406 and server 418 may share a key, and before storing the key map 472 in the archive, the client encrypts the key map using the shared key. Similarly, in initiating a search, the client encrypts the search map using the shared key. The server, in response to receiving the encrypted search map, decrypts the search map and archived key maps using the shared key.

Figure 12:
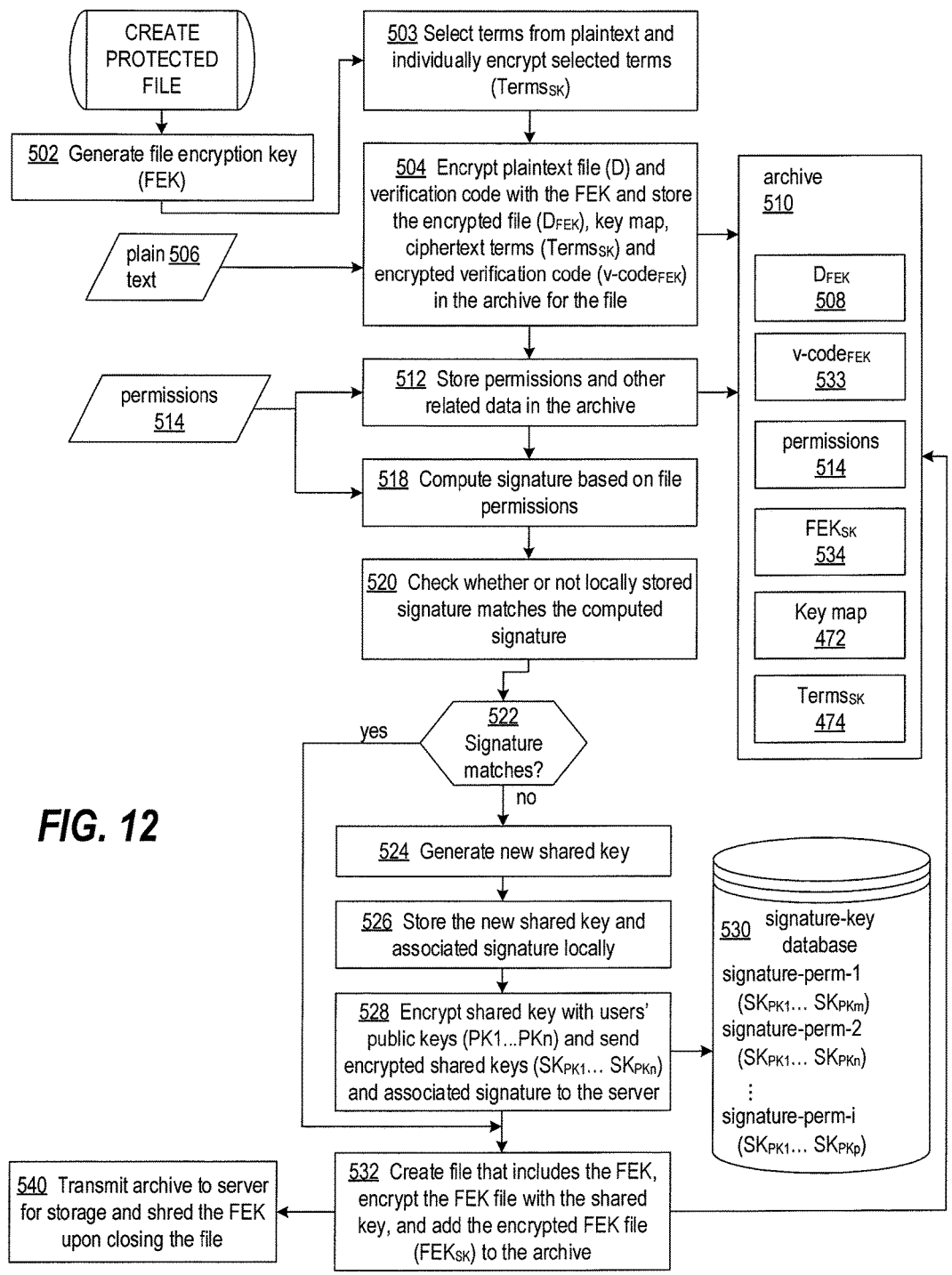
FIG. 12 shows a process for creating a protected file, in the environment of FIG. 11.

FIG. 12 shows a process for creating a protected file, in the environment of FIG. 11. At block 502, a file encryption key (FEK) is generated to be used to encrypt the file. The FEK is a random 256-bit AES key and may be generated by obtaining 32 bytes of random data from the OpenSSL Rand interface as indicated above.

At block 503, the process selects plaintext terms from the file and generates respective ciphertext file terms from the plaintext file terms. In one implementation, the process selects every term that is not a previously designated key term or an article, pronoun, conjunction etc. In another implementation, the process selects all terms except for articles, pronouns, conjunctions etc. In generating the ciphertext file terms the client may encrypt each plaintext file term using the shared key (SK). Alternatively, the ciphertext file terms may be further obscured to reduce information leakage as described below.

At block 504, the plaintext file 506 is encrypted using the FEK. In addition, a verification code may be encrypted using the FEK. The verification code may be subsequently used for authentication purposes when attempting to read the encrypted file. In an example implementation, the verification code may be generated from a hash function, such as MD5 or SHA-2, applied to the plaintext file. The encrypted file $D_{FEK}$ 508, key map 472 (generated as previously described), ciphertext $Terms_{SK}$ 474, and the encrypted verification code v-code$_{FEK}$ 533 are stored in the archive 510. Authenticated ciphers, such as AES-GCM, may also be used instead of a separate authentication code. The key map 472 may be optionally encrypted using a key shared with the server. In an example implementation, the archive file is a POSIX tar format file. It will be appreciated that other proprietary or open source types of archives or containers may be suitable.

The permissions 514 and other related data are also stored in the archive 510 at block 512. The related data may include metadata that describe the file and/or archive, such as version number, date/time of last modification, device on which the file was last modified, the owner of the archive, date/time that the archive was created, identification of the encryption algorithm employed to encrypt the file, a file type, and size, for example. Other related data may include keywords and thumbnails.

At block 518, a signature is calculated from the permissions 514, which control access to the file. In an example implementation, the signature is the left-most 12-bytes of the MD5 hash of an ordered JSON string that represents the permissions. Block 520 checks whether or not the generated signature matches a previously generated signature stored locally at the client. If the generated signature does not match any locally stored signature, at decision block 522, a new shared key needs to be generated, and the process is directed to block 524.

A new shared key is generated at block 524. The shared key is a random 256-bit AES key and may be generated by obtaining 32 bytes of random data from the OpenSSL Rand interface as indicated above. At block 526, the shared key is stored locally on the client in association with the generated signature. The local storage of the signature and shared key is in volatile RAM and not in retentive (e.g., disk) storage of the client. Once the shared key is no longer needed by the client, it is shredded. That is, the memory occupied by the shared key may be overwritten with irrelevant data.

At block 528, the new shared key is encrypted with the public keys of those users identified in the permissions as having access to the file. That is, for each user, the shared key is encrypted with that user's public key and that encrypted shared key is saved so that the user can later decrypt the encrypted FEK. Also at block 528, the encrypted shared keys and associated signature are transmitted to the server for storage in a signature-key database 530.

A file is created to store the FEK, and that file is encrypted using the shared key at block 532. The encrypted FEK file $FEK_{SK}$ 534 is also added to the archive 510 at block 532. Upon closing the archive, the FEK is shredded at block 540. That is, once access to the archive and its contents is no longer needed on the client, the memory occupied by the FEK may be overwritten with irrelevant data.

Figure 13:
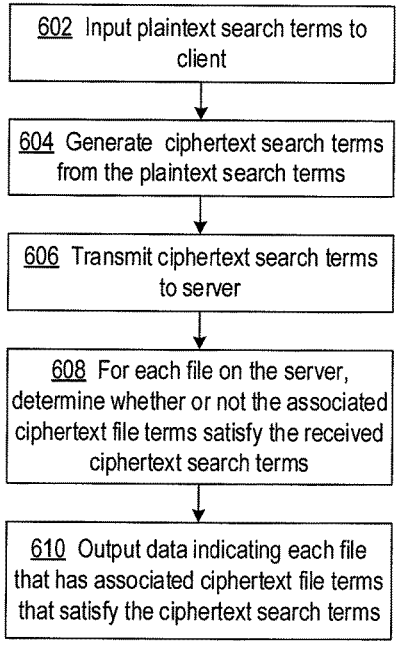
FIG. 13 shows a process of performing a search for files that match an input set of search terms using ciphertext search terms and sets of ciphertext file terms associated with the files.

FIG. 13 shows a process of performing a search for files that match an input set of search terms using ciphertext search terms and sets of ciphertext file terms associated with the files. At block 602, one or more plaintext search terms are input to a client. The input may be a simple list of a set of plaintext search terms or may include one or more logic operators (e.g., AND, OR, NOT) along with the search terms. For a simple list of search terms without logic operators, such as: "search-term-1 search-term-2 search-term-3," an AND operator may be the default operator in one implementation, and specification of the OR operator may be required to effect an OR operation. Search expressions may be preprocessed on the client to match the document processing (e.g. case folding) and additional techniques for abbreviations, synonyms and spelling correction may be applied to improve the matching. Search expressions may include standard search operators such as AND, OR, and NOT and more precise operators such as "intitle:Dave", "filetype:PDF" and similar forms.

At block 604, respective ciphertext search terms are generated from the plaintext search terms. In one implementation, the ciphertext search terms may be generated by encrypting each plaintext search term with the SK described above. In another implementation, the ciphertext search terms may be obfuscated as described below.

The ciphertext search terms are transmitted to the server at block 606. At block 608, the server processes the ciphertext search terms against each set of ciphertext file terms associated with each of the ciphertext files to determine whether or not the ciphertext file terms satisfy the ciphertext search terms.

At block 610, the server outputs data indicating each file that has an associated set of ciphertext file terms that satisfies the received set of ciphertext search terms. The data may include URLs of files or other references that enable a user to access the matching files.

Figure 14:
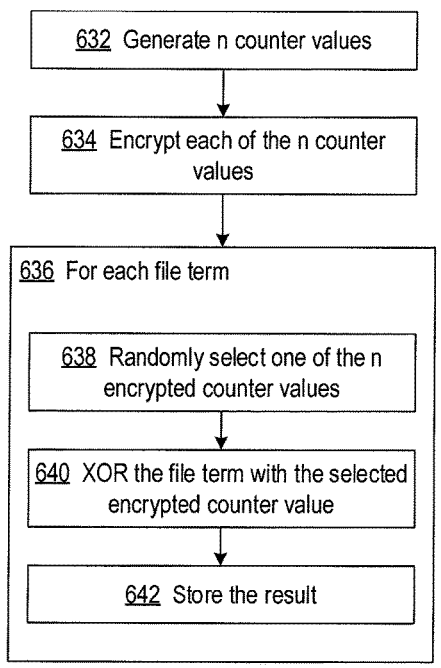
FIG. 14 shows a flowchart of a process performed by a client of obfuscating the ciphertext file terms in order to mitigate information leakage.

FIG. 14 shows a flowchart of a process performed by a client of obfuscating the ciphertext file terms in order to mitigate information leakage. The sets of ciphertext file terms may leak information about terms that are shared by multiple files. From this leakage, the relationship of files might be discovered, and if access to a plaintext version of one of the files is obtained, information about related ciphertext files may be discovered. In one approach to mitigate information leakage, different encryptions are used to generate the ciphertext file terms.

In one implementation, a number (n) of counter values are encrypted, and one of the encrypted counter values is selected at random. The selected encrypted counter value is XORed with each of the plaintext file terms to generate respective ciphertext file terms. Instead of searching for a single ciphertext search term, n ciphertext search terms are searched. A plaintext search term is determined to be in a file if any of n possible ciphertext search terms generated from the plaintext search term generated by a client matches one of the ciphertext file terms associated with the ciphertext file on the server.

At block 632, n counter values are generated by a client, and each of the counter values is encrypted using the SK at block 634. For each plaintext file term, the processing of block 636 is performed. At block 638, one of the encrypted counter values is selected at random, and the selected encrypted counter value is XORed with the plaintext file term at block 640. The result of the XOR operation is the ciphertext file term. At block 642, the ciphertext file term is stored in association with the ciphertext file.

Figure 15:
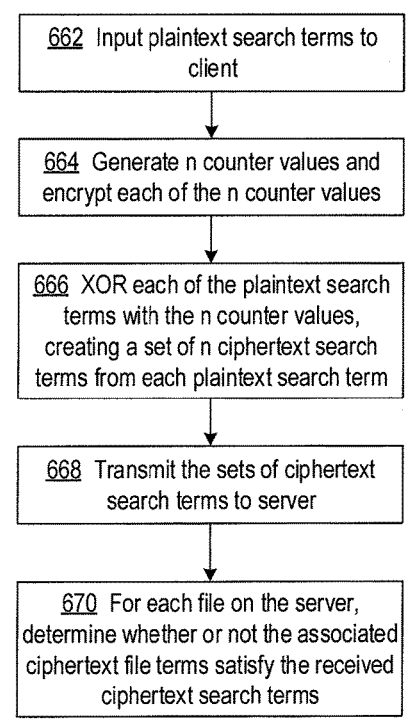
FIG. 15 is a flowchart of a process of searching files for obfuscated ciphertext search terms.

FIG. 15 is a flowchart of a process of searching files for obfuscated ciphertext search terms. The search process of FIG. 15 corresponds to the process of FIG. 14 by which ciphertext file terms for a file are generated. At block 662, plaintext search terms are input to a client as described above. The client generates n counter values and encrypts the n counter values using the SK at block 664. The counter values generated at block 664 for searching are the same counter values generated at block 632 in FIG. 14.

At block 666, the client generates a set of candidate ciphertext search terms for each of the plaintext search terms. Each set of candidate ciphertext search terms includes n terms. Each of the n terms is a result of XORing the plaintext search term with one of the n encrypted counter values. A different one of the encrypted counter values is used with each XOR operation. The number of sets of candidate ciphertext search terms is equal to the number of input plaintext search terms. At block 668, the client transmits the sets of candidate ciphertext search terms to the server.

The server, at block 670, determines for each file whether or not the associated ciphertext file terms satisfies the sets of ciphertext search terms. Depending on the number of files and number of ciphertext file terms, multiple servers may be employed to distribute the search processing. The candidate ciphertext search terms in each set are compared to the associated ciphertext file terms. If any one of the candidate ciphertext search terms in the set matches one of the ciphertext file terms, the ciphertext file terms satisfy that set of candidate ciphertext search terms. The server determines whether or not the ciphertext file terms satisfies the sets of candidate ciphertext search terms according to any logic operators sent along with the candidate sets by the client.

FIG. 16 shows a flowchart of a process of preparing an inverted index table from ciphertext file terms by a client and a server. The inverted index table stores precomputed matches so that a table lookup may be performed to process a search. Each index in the inverted index table refers to those files that have the ciphertext file term, where the index is a result of a hash function applied to the ciphertext file term.

At block 702, plaintext file terms are selected from the plaintext file, and the process of block 704 is performed for each selected plaintext file term. At block 706, the plaintext file term is encrypted using the SK, and at block 708, an index value is determined from a hash function of the ciphertext file term. Any hash function that produces a unique value from the input ciphertext file term may be used. The index value is stored in a term table or other suitable data structure at block 710. Once all selected plaintext file terms have been processed, the term table will have stored index values corresponding to the ciphertext file terms of the file.

The plaintext file is encrypted using the SK at block 712, and the ciphertext file and term table are transmitted to the server at block 714. The server, at block 716, updates the inverted index table according to the received ciphertext file and associated term table. The inverted index table is updated at the indices specified in the received term table, to reference the ciphertext file accompanying the term table. The reference may be a file name or URL, for example. In one implementation, the file name may be encrypted by the SK. The cipher text file is stored on the server at block 718.

FIG. 17 shows a flowchart of a process of searching for files that match ciphertext search terms using inverted index tables. FIG. 18 shows an example in which an inverted index table has been constructed from m term tables, and a search table that may be processed against the inverted index table. The process of FIG. 17 is described in conjunction with the example of FIG. 18.

Term tables 1-m (FIG. 18) are generated for file 1-m according to the process of FIG. 16. Term table 1 indicates that ciphertext file 1 has ciphertext terms for which the hash function produces index values 5 and 2. Term table 2 indicates that ciphertext file 2 has ciphertext terms for which the hash function produces index values 3, 9, 6, and 4. Term table 3 indicates that ciphertext file 3 has ciphertext terms for which the hash function produces index values 7, n, 5, and 6. Term table m indicates that the ciphertext file m has ciphertext terms for which the hash function produces index values 7, n, 1, 8, 9, and 2.

The inverted index table 746, as constructed from term tables 1-*m*, shows that index 1 references file m; index 2 references file 1 and file m; index 3 references file 2; index 4 references file 2; index 5 references file 1 and file 3; index 6 references file 2 and file 3; index 7 references file 3 and file m; index 8 references file m; index 9 references file 2 and file m; and index n references file 3 and file m.

At block 732 (FIG. 17), plaintext search terms are input on a client, and the client encrypts the plaintext search terms using the SK at block 734. An index value is determined from the hash function (FIG. 16, #708) of each ciphertext search term at block 736. At block 738, each of the index values is stored in a search table or other suitable data structure, and the search table is transmitted to the server.

The server, at block 740, looks up in the inverted index table the sets of file references associated with the index values specified in the search table. The example search table 748 in FIG. 18 includes index values n, 5, and 7. At block 742, the server determines whether or not a ciphertext file satisfies the received search table. If the default logic operator AND is applied to the search table, a ciphertext file satisfies the search table if the file is referenced in the inverted index table at every index specified by the search table. In the example search table 748, file 3 is the only file that matches the search table as file 3 is referenced at index n, index 5, and index 7 in the inverted index table 746. At block 744, the server outputs data indicating each file that satisfies the search table. The data may include URLs of files or other references that enable a user to access the matching files.

In another implementation, a search expression that specifies plaintext terms and logic operators may be input at block 732, and a search expression that includes the index values and logic operators may be constructed at block 738. A data structure that accommodates both index values and logic operators may be used instead of a search table having only index values. For a search expression having index values and logic operators, the server determines a match according to the index values and specified logic operators.

In implementations in which the files are encrypted, file names may also be encrypted, which prevents the server from leaking the file name. The encrypted file names of files that satisfy a search request may be returned to a client and decrypted by the client.

The following approach may be combined with the above-described approaches to enable searching of encrypted files for phrases in addition to sets of terms. The process generally entails selecting important anchor terms from an input search phrase, searching for the anchor terms by the server in the files using the above-described approaches, and searching for the phrase by the client in files that have the anchor terms. If there are an insufficient number of anchor words to sufficiently narrow the search space, then the user could be notified that the search would be prolonged unless a more meaningful search phrase were provided.

Figure 19:
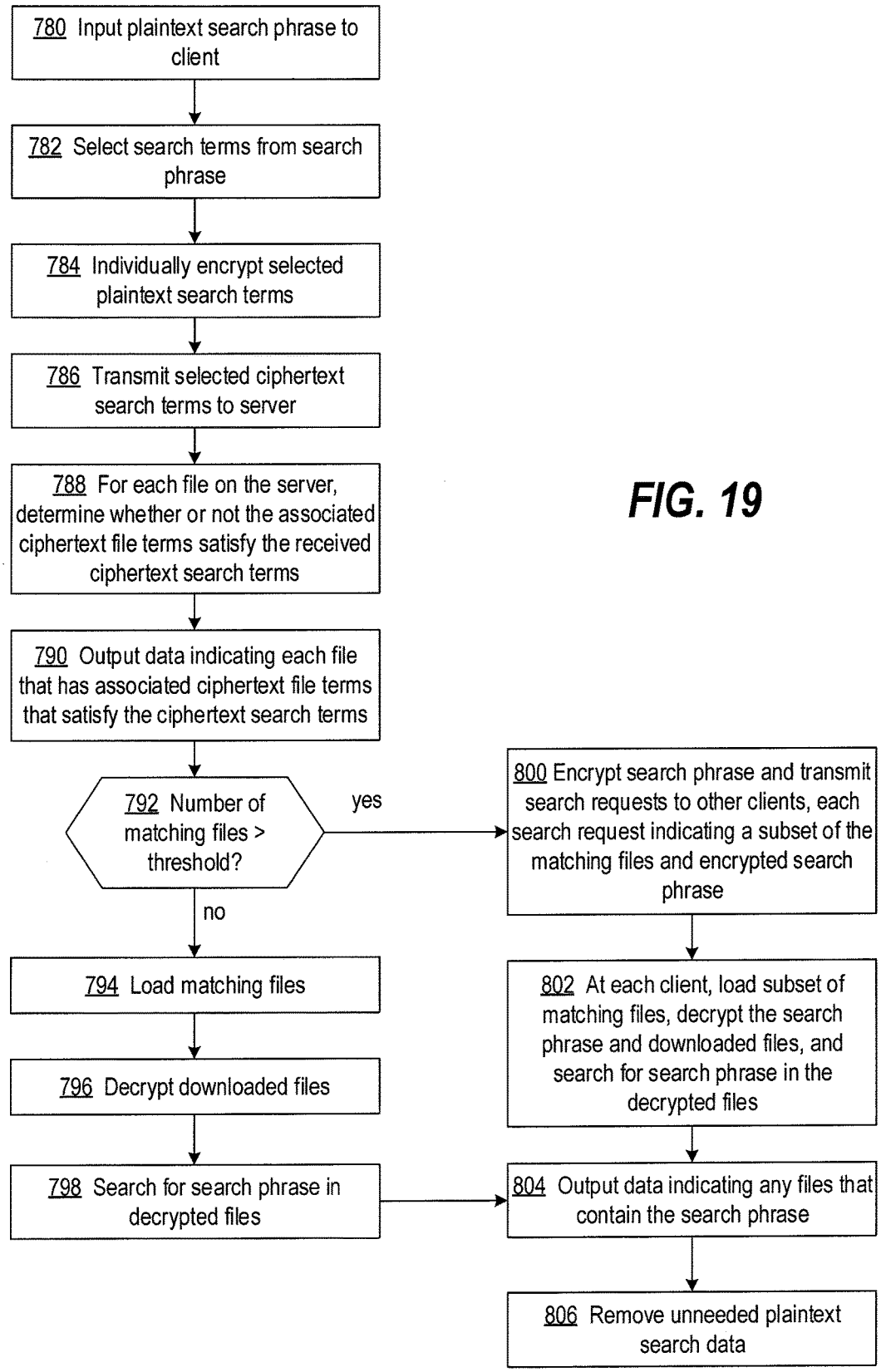
FIG. 19 shows a flowchart of a process of searching for a phrase in encrypted files.

FIG. 19 shows a flowchart of a process of searching for a phrase in encrypted files. At block 780, a plaintext search phrase is input to the client, and the client selects search terms from the search phrase at block 782. Approaches such as stop word removal, case folding, punctuation stripping, and word stemming may be used to select the search terms from the search phrase. In addition synonym mapping, abbreviation expansion, spelling correction and other techniques may be used to expand the search terms to capture the user's intent from the search phrase. Quotes in a phrase may be interpreted as an indication that all or a substring of the search phrase is to be matched exactly. Case folding and other methods may be applied to select terms from the quoted search phrase. Alternatively, the quoted phrase may become another search term, which would trigger specialized matching algorithms to be applied during the search.

The search terms are individually encrypted at block 784 using the SK, and the ciphertext search terms are transmitted to the server at block 786. The server determines for each file at block 788, whether or not the associated ciphertext file terms satisfy the received ciphertext search terms, and outputs at block 790 data indicating each matching file. The client receives the output data, and at decision block 792 determines whether or not the number of matching files is too large to complete the search on the single client. If the number of matching files is less than or equal to a threshold value, the process proceeds to block 794, where the client loads the matching files (if not already loaded). Loading a file generally entails placing the contents of the file in local storage of the client, such as in RAM of the client or on retentive storage devices such as a magnetic disk or flash memory of the client. If a file is not already locally stored or loaded, the file may be downloaded from a server. At block 796, the client decrypts the downloaded files, and at block 798, the client searches for the plaintext search phrase in the decrypted files. The client outputs, such as to a display device, data that indicates any files that contain the plaintext search phrase at block 804.

If the number of matching files is greater than the threshold, decision block 792 directs the process to block 800, at which the client encrypts the search phrase and transmits search requests to additional clients to assist in the search. The search phrase may be encrypted using the public key of each client, for example. Each search request includes a ciphertext search phrase and data that specify the subset of matching files the receiving client is to search. At block 802, each client loads each file in the specified subset of matching files if the file is not already available on the client, decrypts the ciphertext file and ciphertext search phrase, and searches for the plaintext search phrase in the plaintext file. Each additional client outputs to the requesting client at block 804, data indicating whether any of the subset of matching files has the search phrase. The data output from the additional clients to the requesting client may be encrypted using the public key of the requesting client. At block 806, plaintext data used in the search may be removed from the memory and storage devices of the requesting client and any client assisting in the search. On assisting clients, the plaintext data may be removed immediately after reporting search results to the requesting client. On the requesting client, the plaintext data may be removed when the user indicates the data is no longer needed, such as by entering a new search request or exiting a search program.

Figure 20:
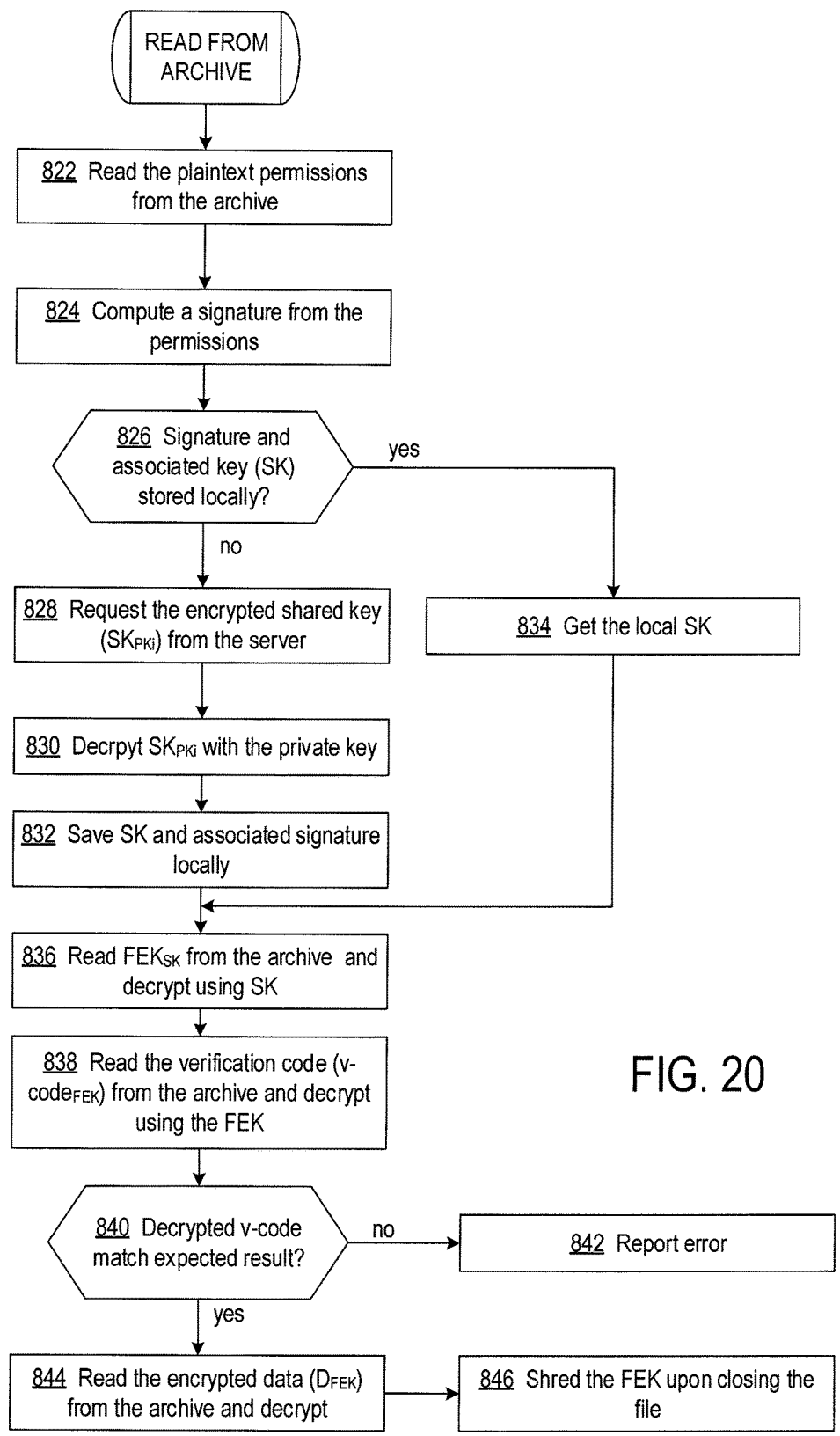
FIG. 20 is a flowchart of a process for reading a protected file.

FIG. 20 is a flowchart of a process for reading a protected file. As indicated above, the file and archive may be shared through a variety of channels and protocols. At block 822, the permissions are extracted from the archive, and a signature of the permissions is computed at block 824. If the computed signature does not match a locally stored signature, decision block 826 directs the process to block 828 where the client requests the encrypted shared key from the server. For example, the encrypted shared key for user i would be $SK_{PK_i}$. The request to the server includes the computed signature so that the server can retrieve the associated set of keys.

At block 830, the encrypted shared key $SK_{PK_i}$ returned from the server is decrypted with the user's private key, and the decrypted shared key SK is stored locally along with the signature at block 832. If the computed signature had previously been stored at the client, decision block 826 directs the process to block 834 where the associated shared key is obtained.

At block 836, the encrypted file encryption key $FEK_{SK}$ is read from the archive and decrypted using the shared key, which was obtained at either block 830 or block 834. The encrypted verification code (v-code$_{FEK}$) is read from the archive and decrypted using the FEK at block 838. If the decrypted v-code matches the expected result, decision block 840 directs the process to block 844 to read the encrypted file ($D_{FEK}$) from the archive and decrypt $D_{FEK}$ using the FEK. At block 846, the FEK is shredded when it is no longer needed. If the decrypted v-code does not match the expected result, an error is reported at block 842.

Figure 21:
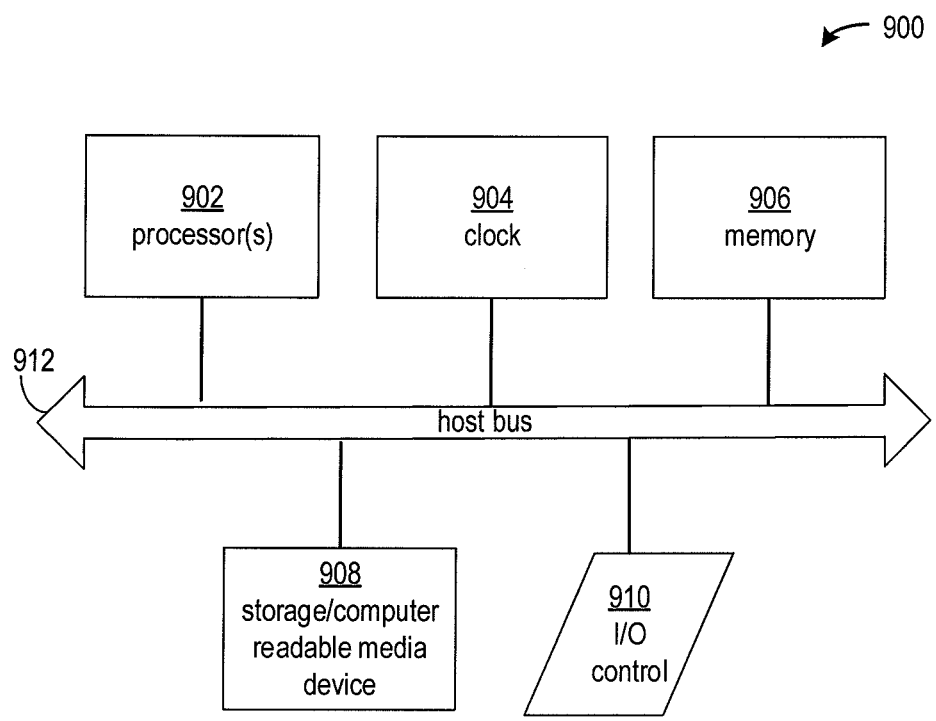
FIG. 21 is a block diagram of an example computing arrangement on which the processes described herein may be implemented.

FIG. 21 is a block diagram of an example computing arrangement on which the processes described herein may be implemented. The computing arrangement may be scaled to implement the clients and servers disclosed herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 900 includes one or more processors 902, a clock signal generator 904, a memory arrangement 906, a storage arrangement 908, and an input/output control arrangement 910, all coupled to a host bus 912. The arrangement 900 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 902 may be one or more general purpose processors, or a combination of one or more general purpose processors and suitable co-processors, or one or more specialized processors (e.g., RISC, CISC, pipelined, etc.).

The memory arrangement 906 typically includes multiple levels of cache memory, and a main memory. The storage arrangement 908 may include local and/or remote persistent storage, such as provided by magnetic disks (not shown), flash, EPROM, or other non-volatile data storage. The storage unit may be read or read/write capable. Further, the memory arrangement 906 and storage arrangement 908 may be combined in a single arrangement.

The processor(s) 902 executes the software in storage arrangement 908 and/or memory arrangement 906, reads data from and stores data to the storage arrangement 908 and/or memory arrangement 906, and communicates with external devices through the input/output control arrangement 910. These functions are synchronized by the clock signal generator 904. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for securing shared data. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of searching for key terms in a plurality of files, comprising:

performing by a server, operations including:

associating a respective key map with each file of the plurality of files in a memory of the server, wherein each respective key map includes a plurality of bit values and each bit value indicates for a respective key term of a plurality of possible key terms whether or not the respective key term is present in the file associated with the respective key map, wherein positions of the bit values in the search map correspond to the plurality of possible key terms, respectively;

inputting a search map, wherein the search map includes a plurality of bit values and each bit value indicates for a respective key term of the plurality of possible key terms whether or not the respective key term is a key term to search;

determining for each respective key map, whether or not the respective key map satisfies the search map, the determining including:

constructing an inverted index table in a memory of the server from the respective key map for each file of the plurality of files, wherein the inverted index table includes indices that correspond to respective positions of bit values in each key map of the plurality of key maps, and associated with each index a respective file indicator that references each file of the plurality of files that has the respective key term that corresponds to the respective position in the key map; and looking up in the inverted index table, at each index corresponding to each position of a bit value in the search map that indicates the respective key term is a key term to search, each associated file indicator; and outputting data indicating each file of the plurality of files having an associated respective key map that satisfies the search map.

2. The method of claim 1, further comprising:
performing by a client, operations including:
   inputting one or more key terms of the plurality of possible key terms as one or more key terms to search;
   determining for the one or more key terms, one or more respective positions in the search map assigned to the one or more key terms;
   storing in the one or more respective positions in the search map in a memory of the client, a first value that indicates the one or more key terms are key terms to search;
   storing in positions in the search map other than the one or more respective positions, a second value that indicates key terms other than the one or more key terms are key terms not to search; and
   transmitting the search map from the client to the server.

3. The method of claim 1, further comprising:
performing by a client, operations including:
   generating a stream of bits having bit values of 0 and 1, wherein a number of bit values of 0 is greater than or equal to a number of the plurality of possible key terms;
   assigning the plurality of possible key terms to respective positions having bit values of 0 in the stream of bits;
   for each file of the plurality of files, generating the respective key map by performing operations including:
      randomly selecting a subset of positions having bit values of 1 in an instance of the stream of bits;
      storing bit values of 0 in the subset of positions in the instance of the stream of bits in a memory of the client; and
      storing for each key term in the file, a bit value of 1 in the instance of the stream of bits at the respective position assigned to the key term, wherein the instance of the stream of bits is the respective key map.

4. The method of claim 1, further comprising:
performing by a client, operations including:
   generating a stream of bits having bit values of 0 and 1, wherein a number of bit values of 0 is greater than or equal to a number of the plurality of possible key terms;
   assigning the plurality of possible key terms to respective positions having bit values of 0 in the stream of bits;
   storing bit values of 0 in every other position having a bit value of 1 in the stream of bits in a memory of the client;
   for each file of the plurality of files, generating the respective key map by performing operations including:
      randomly selecting a subset of positions having bit values of 1 in an instance of the stream of bits;
      storing bit values of 0 in the subset of positions in an instance of the stream of bits; and
      storing for each key term in the file, a bit value of 1 in the instance of the stream of bits at the respective position assigned to the key term, wherein the instance of the stream of bits is the respective key map.

5. The method of claim 1, further comprising:
   generating by a client, a combined key map from a plurality of key maps that are a subset of the respective key maps;
   transmitting the combined key map from the client to the server;
   wherein the determining includes:
      determining by the server whether or not the combined key map satisfies the search map; and
   wherein a key map of the plurality of key maps satisfies the search map in response to determining that the combined key map satisfies the search map.

6. The method of claim 1, further comprising:
   generating by a client, a combined key map from a plurality of key maps that are a subset of the respective key maps, wherein each file of the plurality of files that is associated with one key map of the subset of key maps has a file name having characteristics shared by each other file of the plurality of files that is associated with other key maps of the subset of key maps;
   transmitting the combined key map from the client to the server;
wherein the determining includes:
   determining by the server whether or not the combined key map satisfies the search map; and
   wherein a key map of the plurality of key maps satisfies the search map in response to determining that the combined key map satisfies the search map.

7. The method of claim 1, wherein the determining includes:
   generating, by a client, a combined key map from a plurality of key maps that are a subset of the respective key maps, wherein each key map of the subset of key maps has a number of key terms in common with each other key map of the subset of key maps, and the number of key terms is greater than a threshold value;
   transmitting the combined key map from the client to the server;
   determining by the server whether or not the combined key map satisfies the search map; and
   wherein a key map of the plurality of key maps satisfies the search map in response to determining that the combined key map satisfies the search map.

8. The method of claim 1, further comprising:
   wherein each respective key map indicates for each key term of the plurality of possible key terms a respective level of importance of the key term relative to each other key term of the plurality of key terms;
   determining, for each respective key map that satisfies the search map, a respective metric that indicates a quality of match as a function of the respective level of importance of each key term of the plurality of possible key terms that matches a key term to search indicated by the search map; and
   sorting the data indicating each file of the plurality of files having an associated respective key map that satisfies the search map, according to the respective metric that indicates the quality of match between the respective key map and the search map.

9. The method of claim 1, wherein each file of the plurality of files is encrypted.

10. The method of claim 1, further comprising:
   encrypting by a client, each respective key map into a respective encrypted key map using a shared encryption key, wherein the associating includes associating each respective encrypted key map with each file of the plurality of files;
encrypting by the client the search map into an encrypted search map using the shared encryption key, wherein the inputting the search map includes inputting the encrypted search map; and
wherein the determining includes decrypting the search map and each respective key map using the shared encryption key on the server.

11. The method of claim 1, further comprising:
performing by a client, operations including:
preparing the respective key map for each file of the plurality of files, wherein positions of the bit values in each key map correspond to the plurality of possible key terms, respectively; and
transmitting each respective key map to the server; and
wherein the file indicator that is associated with every index that corresponds to every position of a bit value in the search map that indicates the respective key term is a key term to search, has each key term indicated by the search map.

12. The method of claim 1, further comprising:
encrypting each file of the plurality of files into a respective ciphertext file with a first key;
storing a set of permissions in association with each ciphertext file;
generating a first signature from the set of permissions;
encrypting the first key using a second key;
storing the encrypted first key in association with the ciphertext file;
for each user of a plurality of users permitted access to the plurality of files, encrypting the second key into a respective encrypted second key with a public key of a respective public-private key pair of the user; and
transmitting the ciphertext file, first signature and the encrypted second key to a server for storage.

13. The method of claim 12, further comprising: downloading the respective ciphertext file and encrypted second key from the server to a client in response to a request for the ciphertext file:
decrypting the encrypted second key into a decrypted second key using a private key of the public-private key pair of the user;
decrypting the encrypted first key into a decrypted first key using the decrypted second key; and
decrypting the ciphertext file into a plaintext file with the decrypted first key.

14. A system for searching for key terms in a plurality of files, comprising:
a server including a processor and a memory, wherein the memory is configured with instructions that when executed by the processor, cause the processor to perform operations including:
associating a respective key map with each file of the plurality of files in the memory of the server, wherein each respective key map includes a plurality of bit values and each bit value indicates for a respective key term of a plurality of possible key terms whether or not the respective key term is present in the file associated with the respective key map, wherein positions of the bit values in the search map correspond to the plurality of possible key terms, respectively;
inputting a search map, wherein the search map includes a plurality of bit values and each bit value indicates for a respective key term of the plurality of possible key terms whether or not the respective key term is a key term to search;
determining for each respective key map, whether or not the respective key map satisfies the search map, the determining including:
constructing an inverted index table in a memory of the server from the respective key map for each file of the plurality of files, wherein the inverted index table includes indices that correspond to respective positions of bit values in each key map of the plurality of key maps, and associated with each index a respective file indicator that references each file of the plurality of files that has the respective key term that corresponds to the respective position in the key map; and
looking up in the inverted index table, at each index corresponding to each position of a bit value in the search map that indicates the respective key term is a key term to search, each associated file indicator; and
outputting data indicating each file of the plurality of files having an associated respective key map that satisfies the search map.

15. The system of claim 14, further comprising:
a client including a processor and a memory, wherein the client is communicatively coupled to the server and the memory is configured with instructions that when executed by the processor, cause the processor to perform operations including:
inputting one or more key terms of the plurality of possible key terms as one or more key terms to search;
determining for the one or more key terms, one or more respective positions in the search map assigned to the one or more key terms;
storing in the one or more respective positions in the search map in the memory of the client, a first value that indicates the one or more key terms are key terms to search;
storing in positions in the search map other than the one or more respective positions, a second value that indicates key terms other than the one or more key terms are key terms not to search; and
transmitting the search map from the client to the server.

16. The system of claim 14, further comprising:
a client including a processor and a memory, wherein the client is communicatively coupled to the server and the memory is configured with instructions that when executed by the processor, cause the processor to perform operations including:
generating a stream of bits having bit values of 0 and 1, wherein a number of bit values of 0 is greater than or equal to a number of the plurality of possible key terms;
assigning the plurality of possible key terms to respective positions having bit values of 0 in the stream of bits;
for each file of the plurality of files, generating the respective key map by performing operations including:
randomly selecting a subset of positions having bit values of 1 in an instance of the stream of bits;
storing bit values of 0 in the subset of positions in an instance of the stream of bits in the memory of the client; and storing for each key term in the file, a bit value of 1 in the instance of the stream of bits at the respective position assigned to the key term, wherein the instance of the stream of bits is the respective key map.

17. The system of claim 14, further comprising:
a client including a processor and a memory, wherein the client is communicatively coupled to the server and the memory is configured with instructions that when executed by the processor, cause the processor to perform operations including:
generating a stream of bits having bit values of 0 and 1, wherein a number of bit values of 0 is greater than or equal to a number of the plurality of possible key terms;
assigning the plurality of possible key terms to respective positions having bit values of 0 in the stream of bits;
storing bit values of 0 in every other position having a bit value of 1 in the stream of bits in the memory of the client;
for each file of the plurality of files, generating the respective key map by performing operations including:
randomly selecting a subset of positions having bit values of 1 in an instance of the stream of bits;
storing bit values of 0 in the subset of positions in an instance of the stream of bits; and
storing for each key term in the file, a bit value of 1 in the instance of the stream of bits at the respective position assigned to the key term, wherein the instance of the stream of bits is the respective key map.

18. The system of claim 14, further comprising:
a client including a processor and a memory, wherein the client is communicatively coupled to the server and the memory is configured with instructions that when executed by the processor, cause the processor to perform operations including:
generating a combined key map from a plurality of key maps that are a subset of the respective key maps; and
transmitting the combined key map to the server;
wherein the instructions that cause the processor of the server to perform the determining include instructions that cause the processor to perform operations including:
determining by the server whether or not the combined key map satisfies the search map; and
wherein a key map of the plurality of key maps satisfies the search map in response to determining that the combined key map satisfies the search map.

19. The system of claim 14, further comprising:
a client including a processor and a memory, wherein the client is communicatively coupled to the server and the memory is configured with instructions that when executed by the processor, cause the processor to perform operations including:
generating a combined key map from a plurality of key maps that are a subset of the respective key maps, wherein each file of the plurality of files that is associated with one key map of the subset of key maps has a file name having characteristics shared by each other file of the plurality of files that is associated with other key maps of the subset of key maps;
transmitting the combined key map to the server;
wherein the instructions that cause the processor of the server to perform the determining include instructions that cause the processor to perform operations including:
determining by the server whether or not the combined key map satisfies the search map; and
wherein a key map of the plurality of key maps satisfies the search map in response to determining that the combined key map satisfies the search map.

20. The system of claim 14, further comprising:
a client including a processor and a memory, wherein the client is communicatively coupled to the server and the memory is configured with instructions that when executed by the processor, cause the processor to perform operations including:
generating a combined key map from a plurality of key maps that are a subset of the respective key maps, wherein each key map of the subset of key maps has a number of key terms in common with each other key map of the subset of key maps, and the number of key terms is greater than a threshold value;
transmitting the combined key map to the server;
wherein the instructions that cause the processor of the server to perform the determining include instructions that cause the processor to perform operations including:
determining whether or not the combined key map satisfies the search map; and
wherein a key map of the plurality of key maps satisfies the search map in response to determining that the combined key map satisfies the search map.

21. The system of claim 14, wherein:
each respective key map indicates for each key term of the plurality of possible key terms a respective level of importance of the key term relative to each other key term of the plurality of key terms;
the memory of the server is further configured with instructions that when executed by the processor of the server cause the processor to perform operations including:
determining, for each respective key map that satisfies the search map, a respective metric that indicates a quality of match as a function of the respective level of importance of each key term of the plurality of possible key terms that matches a key term to search indicated by the search map; and
sorting the data indicating each file of the plurality of files having an associated respective key map that satisfies the search map, according to the respective metric that indicates the quality of match between the respective key map and the search map.

22. The system of claim 14, wherein each file of the plurality of files is encrypted.

23. The system of claim 14, further comprising:
a client including a processor and a memory, wherein the client is communicatively coupled to the server and the memory is configured with instructions that when executed by the processor, cause the processor to perform operations including:
encrypting each respective key map into a respective encrypted key map using a shared encryption key, wherein the associating includes associating each respective encrypted key map with each file of the plurality of files;
encrypting the search map into an encrypted search map using the shared encryption key, wherein the inputting the search map includes inputting the encrypted search map; and wherein the instructions that cause the processor of the server to perform the determining include instructions that cause the processor to decrypt the search map and each respective key map using the shared encryption key.

24. The system of claim 14, further comprising:

a client including a processor and a memory, wherein the client is communicatively coupled to the server and the memory is configured with instructions that when executed by the processor, cause the processor to perform operations including:

preparing the respective key map for each file of the plurality of files, wherein positions of the bit values in each key map correspond to the plurality of possible key terms, respectively; and transmitting each respective key map to the server; and wherein the file indicator that is associated with every index that corresponds to every position of a bit value in the search map that indicates the respective key term is a key term to search, has each key term indicated by the search map.

25. The system of claim 14, further comprising:

one or more clients, each client including a processor and a memory, wherein the client is communicatively coupled to the server and the memory is configured with instructions that when executed by the processor, cause the processor to perform operations including:

encrypting a file of the plurality of files into a respective ciphertext file with a first key;

storing a set of permissions in association with the ciphertext file;

generating a first signature from the set of permissions;

encrypting the first key using a second key;

storing the encrypted first key in association with the ciphertext file;

for a user of a plurality of users permitted access to the plurality of files, encrypting the second key into a respective encrypted second key with a public key of a respective public-private key pair of the user; and transmitting the ciphertext file, first signature and the encrypted second key to the server for storage.

26. The system of claim 25, wherein the memory of each client is further configured with instructions that when executed by the processor of the client cause the processor to perform operations including:

downloading the respective ciphertext file and encrypted second key from the server in response to a request for the ciphertext file;

decrypting the encrypted second key into a decrypted second key using a private key of the public-private key pair of the user;

decrypting the encrypted first key into a decrypted first key using the decrypted second key; and decrypting the ciphertext file into a plaintext file with the decrypted first key.

\* \* \* \* \*